United States Patent [19]

Girard et al.

[11] Patent Number: 5,081,620

[45] Date of Patent: Jan. 14, 1992

[54] BIT RATE RESERVATION IN AN ASYNCHRONOUS PACKET NETWORK

[75] Inventors: Alain Girard; Pierre Boyer; Jean-Pierre Coudreuse, all of Lannion, France

[73] Assignee: French State represented by Minister of the Post, Telecommunications & Space (Centre National d'Etudes des Telecommunications), Issy les Moulineaux, France

[21] Appl. No.: 480,445

[22] Filed: Feb. 14, 1990

[30] Foreign Application Priority Data

Feb. 17, 1989 [FR] France ................ 89 02073

[51] Int. Cl.$^5$ ................ H04Q 11/04; H04J 3/22
[52] U.S. Cl. ................ 370/60; 370/84; 370/94.1
[58] Field of Search ........ 370/60, 60.1, 94.1, 370/84, 58.1, 58.2, 58.3, 77, 79, 112, 91, 92, 94.2

[56] References Cited

U.S. PATENT DOCUMENTS

| | | | |
|---|---|---|---|
| 4,504,943 | 3/1985 | Nagano et al. | 370/84 |
| 4,550,399 | 10/1985 | Caron | 370/84 |
| 4,603,416 | 7/1986 | Servel et al. | 370/60 |
| 4,727,536 | 2/1988 | Reeves et al. | 370/84 |
| 4,788,679 | 11/1988 | Kataoka et al. | 370/84 |
| 4,802,189 | 1/1989 | Wedler | 370/84 |
| 4,884,264 | 11/1989 | Servel et al. | 370/94.1 |
| 4,896,316 | 1/1990 | Lespagnol et al. | 370/94.1 |
| 4,933,932 | 6/1990 | Quinquis et al. | 370/94.1 |
| 4,993,024 | 2/1991 | Quinquis et al. | 370/84 |

*Primary Examiner*—Benedict V. Safourek
*Assistant Examiner*—Alpus H. Hsu
*Attorney, Agent, or Firm*—Lowe, Price, LeBlanc & Becker

[57] ABSTRACT

The method embodying the invention authorizes communication bit rate reservations in a packet switching network. According to the method, a new communication is only accepted by the network if the communication does not exceed a maximum bit rate flowable by the switches of the network. A packet switch in the network comprises a bit rate reservation device for memorizing bit rate informations that are representative of total bit rates flowed by the switch and for processing said information as a function of data carried by service packets. The bit rate reservation device mainly comprises registers respectively associated with multiplex ways of the switch for memorizing the bit rate informations, an adder for incrementing and decrementing the bit rate informations as a function of service packet data, and a comparator for detecting overstepping of the maximum flowable bit rate.

8 Claims, 4 Drawing Sheets

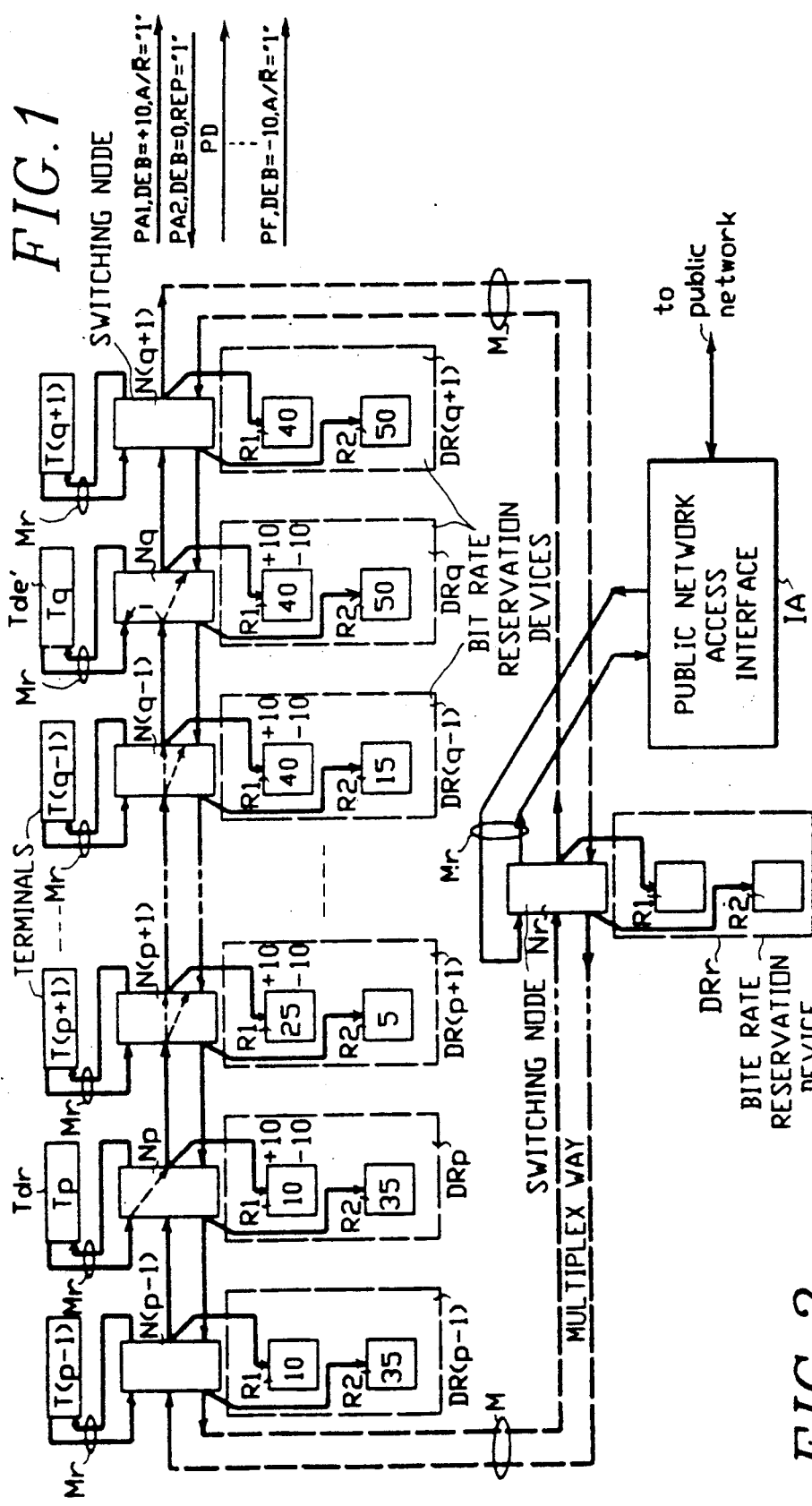
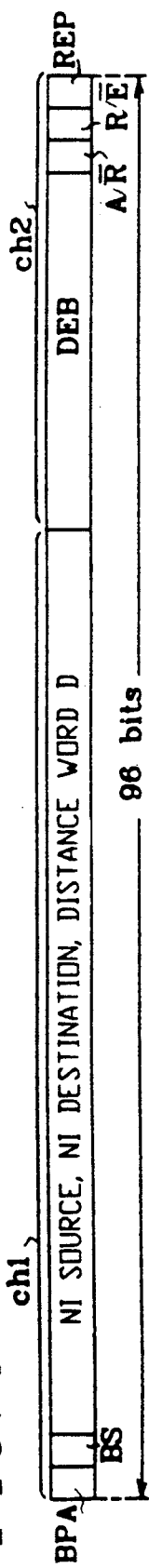

5,081,620

BIT RATE RESERVATION IN AN ASYNCHRONOUS PACKET NETWORK

BACKGROUND OF THE INVENTION

The present invention relates to packet switching in general. More specifically, the invention relates to a method for reserving communication bit rates in a switching network of asynchronous packets and, if necessary, synchronous packets, and to packet switches to implement the method.

The routing of any bit rates and the sharing of the same transmission resources constitute the main advantage of asynchronous time-division switching. Of the well-known switching techniques, this switching technique is the most capable of meeting the different constraints that weigh on wideband integrated services digital networks (WB-ISDN), particularly constraints with regard to adaptability, flexibility and open-endedness. However, in an asynchronous time-division switching network, in application of the flow statistic, no bit rate control is carried out, and any new communication request is accepted by the network. When traffic increases and becomes relatively important, queues included in the network switches overflow and a considerable deterioration of communications ensues. The packet loss rate is then such that the quality of communications is no longer acceptable.

OBJECT OF THE INVENTION

The main object of this invention is to provide a method for reserving communication bit rates in a packet switching network. Another object of this invention is to accept a now communication in a packet switching network only if the new communication does not entail a maximum flowable bit rate being exceeded by the switches of the network.

SUMMARY OF THE INVENTION

Accordingly, service packets are transmitted in a packet time-division switching network at the beginning and end of a communication between two packet transmitting and receiving terminals connected to the network, particularly so as to determine a routing route for the communication and to transmit service informations between the terminals. Bit rate words representative of bit rates of the communication are included in the service packets so as to increment bit rate informations that are memorized in switches of the network crossed by the service packets and that are representative of total bit rates flowed by the switches thereby reserving the bit rates of the communication, prior to the setting-up of the communication, and to decrement the bit rate informations at the end of communication thereby freeing the communication bit rates in the switches. A communication is only derived in the network if the memorized bit rate informations in the switches are representative of a bit rate below a maximum bit rate flowable by the switches.

The invention provides packet switches to implement the above method for reserving communication bit rates in a packet switching network.

Accordingly, a packet time-division switch included in this network comprises input means for detecting packets in incoming multiplex ways thereby transmitting the packets in synchronism, means connected to the input means for multiplexing the packets transmitted by the input means into multiplexed packets, a buffer memory for temporarily memorizing the multiplexed packets, means for demultiplexing the packets read cyclically in the buffer memory thereby transmitting them towards outgoing multiplex ways, means for controlling switchings of the packets as a function of identification, signalling and routing informations contained in the packets, and means for memorizing bit rate informations representative of a total bit rate of communications crossing said switch thereby processing the bit rate informations as a function of the bit rate words detected in the services packets.

Preferably, the memorizing means included in the switch comprises memory registers respectively associated with assemblies of one incoming multiplex way and one outgoing multiplex way for memorizing the bit rate informations, means for identifying the incoming multiplex way in which an incoming service packet is detected thereby selecting the memory register corresponding to the identified incoming multiplex way, means for reading the bit rate information memorized in the selected memory register thereby processing it as a function of the bit rate word included in the incoming service packet, and means for comparing the processed bit rate information with another bit rate information representative of a maximum bit rate flowable multiplex way thereby signalling an overstepping of the maximum bit rate by positioning a given bit of the service packet.

BRIEF DESCRIPTION OF THE DRAWING

Further features and advantages of the invention will be apparent from the following particular description of several preferred embodiments of this invention as illustrated in the corresponding accompanying drawings in which:

FIG. 1 shows the architecture of a chained switching network comprised of plural packet switches embodying the invention in which service packet transfers are carried out in order to reserve bit rates for a unidirectional communication in the forward direction;

FIG. 2 shows the structure of a service packet transmitted in the switching network shown in FIG. 1;

DESCRIPTION OF THE PREFERRED EMBODIMENTS

Figure 3:
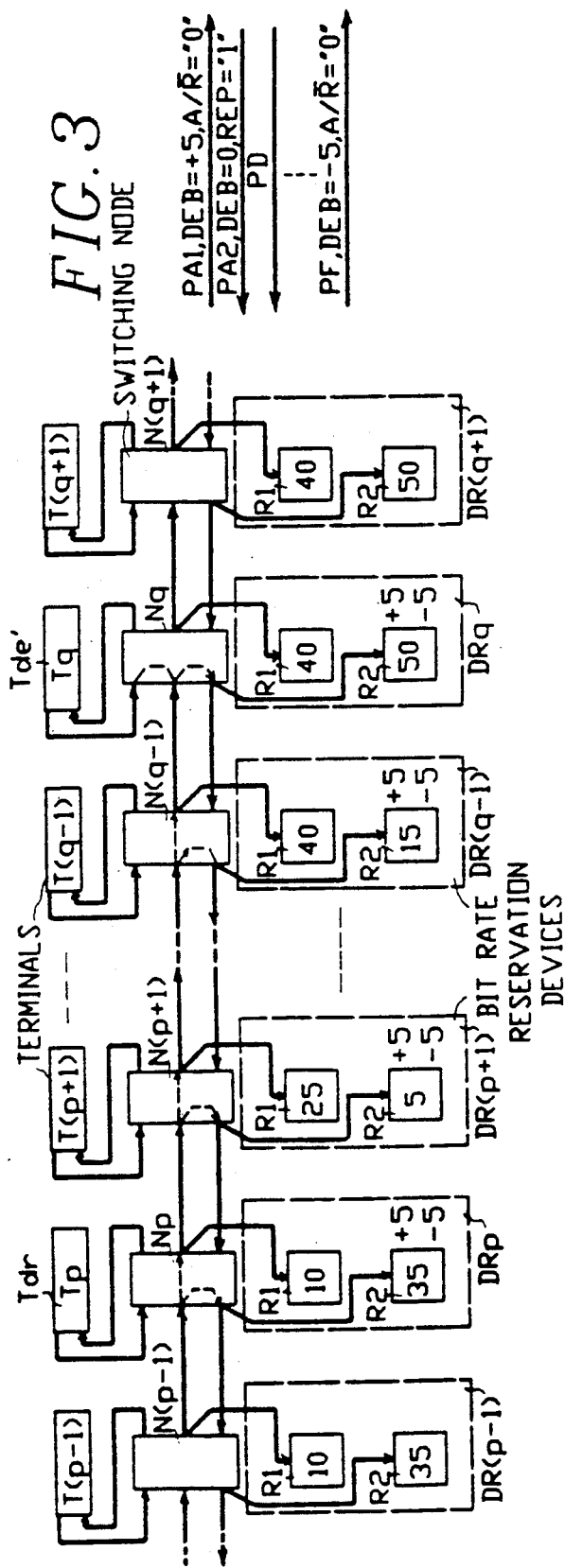
FIG. 3 shows the switching network of FIG. 1 in which transfers of service packets are carried out in order to reserve bit rates for a unidirectional communication in the backward direction.

In FIG. 1 is illustrated a chained communication network of the asynchronous time-division packet switching type.

The network is comprised of plural analogous switching nodes N that are chain-connected by bidirectional multiplex ways M. Any switching node Np is comprised e.g. of a 3×3 packet switch, i.e. a switch connected to three incoming multiplex ways and three outgoing multiplex ways, and is of the paragonal (parallel-diagonal) conversion type as disclosed in U.S. Pat. No. 4,603,416. A node Nr of the network is connected by a connecting multiplex way Mr to an interface IA for access to the public telecommunications network, such as an interface T standardized by the European Electronic Standardization Committee (CENELEC) for connecting a telephone installation to a wideband integrated services digital network (WB-ISDN). Terminals Tp that each support a telephonic, data processing or other application are connected to the network by the nodes Np≠Nr. A bit rate reservation device DRp is associated with each of the switching nodes Np of the network and with the interface IA. Respective identification numbers NI are attributed to the terminals Tp and to the access interface IA.

In such a network, the terminals are equipped with the intelligence required to select routing routes for the packets to be transmitted through the network. A communication setup phase or call phase takes place prior to communication between any two terminals Tp and Tq. During the call phase, the terminals Tp and Tq, respectively deemed the calling party and the called party, transmit to one another service packets, called call packets or plotting packets PA, in order to determine a routing route and to exchange all the informations required for the communication.

In reference to FIG. 2, a call packet PA is comprised e.g. of 96 bits. In a first field ch1 relative to the signalling, identification and routing of the packet, the packet PA comprises notably signalling bits BPA and BS, source and destination identification numbers NI, and a distance word D as well as empty time locations to include routing data to be exchanged between the terminals. In the state "1", the signalling bit BPA indicates to the switching nodes that the packet is a call packet PA. In the opposite case, the bit BPA="0" signals a data packet PD. The bit Bs is positioned by the source terminal that transmitted the packet PA in order to determine the transmission direction of the packet in the chain. The source and destination identification numbers NI respectively indicate the terminal that transmitted the packet PA and the terminal to which the packet was addressed. The distance word D is used to denote the number of communication nodes separating the source terminal from the destination terminal. This number of communication nodes is called "distance". The distance word D is reset to zero on transmission of the packet PA by the source terminal and is incremented by 1 upon each crossing of a communication node throughout the packet journey in the chain, in such a way that once the packet PA has reached the destination terminal, the word D is equal to the distance separating the source terminal from the destination terminal. This distance is then included in the empty time location of another call packet PA returned by response from the destination terminal towards the source terminal. The source terminal memorizes this distance and includes it in a routing field of each of the data packets PD transmitted during the communication.

According to the invention, a second field ch2 relative to the bit rate reservations in the switching nodes is provided in a call packet PA and in end-of-communication packets PF having a structure analogous to the packet PA. The second field ch2 comprises a bit rate word DEB and three signalling and dialogue bits A/R̄, R/Ē and REP.

The bit rate word DEB is a signed word having a positive or negative value. The negative values of the bit rateword DEB are represented as two's complement. Depending on its + or − sign, the word DEB is intended to increment or to decrement the contents of the bit rate reservation registers R1 and R2 included in the different bit rate reservation devices DRp.

In the state "1", the bit A/R̄ indicates that the bit rate reservations are relative to multiplex ways corresponding to an forward transmission direction taken by the packet PA or PF. In the state "0", the bit A/R̄ indicates that the bit rate reservations are relative to multiplex ways corresponding to a backward transmission direction that is the opposite of the transmission direction taken by the packet PA or PF.

In the state "1", the bit R/Ē indicates that the bit rate reservations have been successful in the different switching nodes crossed by a call packet PA. In the state "0", the bit R/Ē indicates that the reservation failed in at least one of the switching nodes crossed by the packet PA, i.e. that the bit rate indicated by the word DEB is not available in at least one of the switching nodes crossed.

The bit REP is a response bit; it is positioned in a call packet PA transmitted by a terminal in response to a first call packet PA received. The bit REP is positioned in the same state as the bit R/Ē of the first call packet PA received and is intended to indicate by return to the terminal that transmitted the first call packet PA whether or not the bit rate reservations were successful. When the bit REP="1", the bit rate reservations have been successfully made in the different switching nodes crossed and the communication can take place. When the bit REP="0", the reservations have failed and the terminal renews its attempt after a given amount of time or immediately makes another attempt in a different transmission direction.

Figure 4:
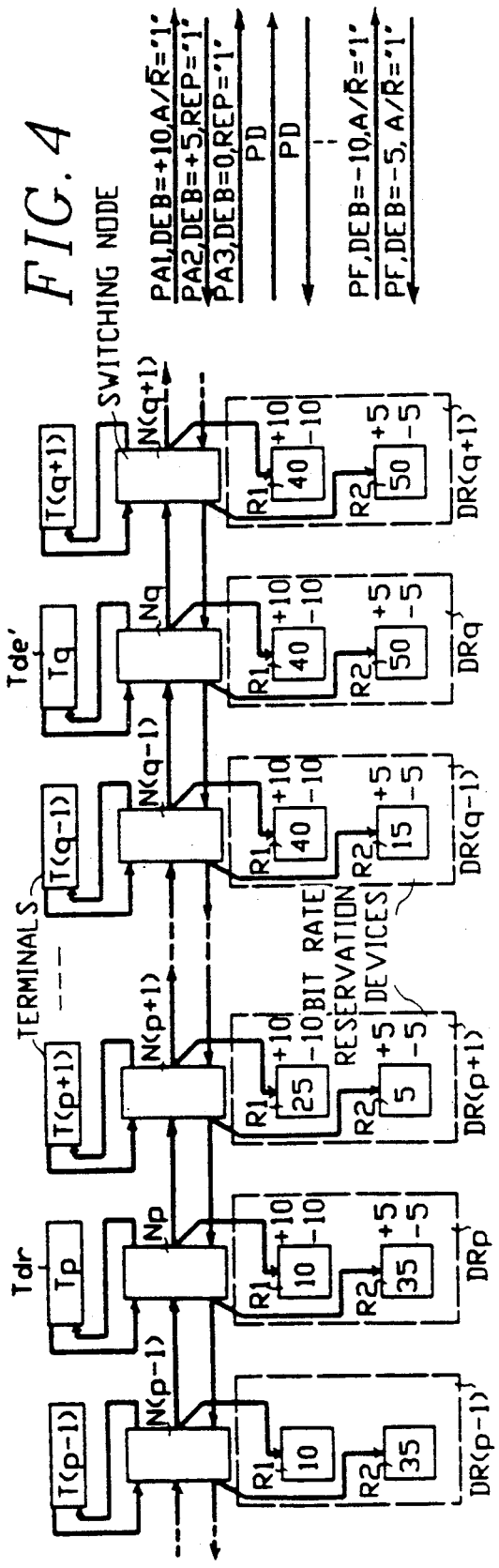
FIG. 4 shows the switching network of FIG. 1 in which transfers of service packets are carried out in order to reserve bit rates for a bidirectional communication.

For three possible types of communication between two terminals Tdr and Tdé, the bit rate reservation operations are now described in reference to FIGS. 1, 3 and 4.

In reference to FIG. 1, a first unidirectional communication is considered between terminals Tdr and Tdé in the forward transmission direction from terminal Tdr towards terminal Tdé. The terminal Tdr is the data source terminal and has data packets PD to be transmitted to the terminal Tdé. The communication bit rate requested by the terminal Tdr is e.g. 10 units.

The terminal Tdr transmits towards the terminal Tdé a first call packet PA1 comprising a bit rate word DEB = +10 and a bit A/R̄"1". The packet PA1 is detected in each of the switching nodes crossed Np to Nq and the word DEB = +10 and the bit A/R̄ are read in the packet PA1 by the corresponding bit rate reservation devices DRp to DRq. The routing of the call packet PA1 via the switching nodes Np to Nq is shown in FIG. 1 by means of arrows drawn in broken lines. First reservation registers R1 are respectively included in the bit rate reservation devices DRp to DRq and are allotted to the forward transmission direction followed by the packet PA1. The contents of these registers R1 are gradually incremented by the bit rate +10 as the packet PA1 progresses and are compared to a maximum disposable bit rate DBmax by a switching node so as to position the state of the bit R/Ē. When the call packet PA1 reaches the destination switching node Nq, the bit R/$\overline{\text{E}}$ is e.g. in the state "1" and indicates that the bit rate reservations have been successful, i.e. that the incremented contents of the registers R1 have not exceeded the maximum bit rate value DBmax.

On reception of the first call packet PA1, the called terminal Tdé transmits a second packet PA2 in response. The second call packet PA2 comprises a bit rate word DEB="0" and a bit REP="1". On receipt of the packet PA2, the terminal Tdr is informed by the bit REP="1" that the bit rate reservations have been made, and begins transmission of the data packets at a bit rate of +10 units.

At the end of the communication, an end-of-communication packet PF is transmitted by the terminal Tdr towards the terminal Tdé in order to decrement the contents of the first registers R1. The packet PF comprises a bit rate word DEB= −10 and a bit A/$\overline{\text{R}}$="1".

In reference to FIG. 3, an unidirectional second communication is considered between the terminals Tdr and Tdé in a backward transmission direction from terminal Tdé towards terminal Tdr. The terminal Tdé is the data source terminal and transmits data packets PD towards the terminal Tdr.

In order to set up the communication and to make the bit rate reservations, the calling terminal Tdr transmits towards the terminal Tdé a first call packet PA1 comprising a bit rate word DEB= +5 and a bit A/$\overline{\text{R}}$="0". The routing of the call packet PA1 via the switching nodes Np to Nq is shown in FIG. 3 by means of arrows drawn in broken lines. The bit A/$\overline{\text{R}}$="0" is detected by the bit rate reservation devices DRp to DRq and indicates that the value of the word DEB= +5 is to be added to the contents of second bit rate reservations registers R2 included respectively in the devices DRp to DRq. In a similar manner to the first unidirectional communication described above, when none of the incremented contents of the registers R2 reach the maximum bit rate DBmax disposable by a switching node, the bit R/$\overline{\text{E}}$/0 of the packet PA1 is in the state "1" when the packet PA1 reaches the terminal Tdé and informs the latter that the bit rate reservations have been successful. The terminal Tdé then transmits to the terminal Tdr a second call packet PA2 comprising a bit rate word DEB="0" and a bit REP="1", before beginning to transmit the data packets PD. At the end of the communication, the terminal Tdr transmits towards the terminal Tdé an end-of-communication packet PF with a bit rate word DEB= −5 and a bit A/$\overline{\text{R}}$="0" so as to decrement the contents of the second registers R2.

In reference to FIG. 4, a bidirectional communication is considered between the terminals Tdr and Tdé. In order to set up the communication and to make the bit rate reservations, three call packets PA1, PA2 and PA3 are exchanged between the terminals Tdr and Tdé. The first packet PA1 is transmitted by the terminal Tdr and comprises a bit rate word DEB= +10 and a bit A/$\overline{\text{R}}$"1" so as to increment the contents of the first registers R1. On reception of the packet PA1, the terminal Tdé transmits the second packet PA2. The packet PA2 comprises a bit rate word DEB= +5, a bit A/$\overline{\text{R}}$"1" and a bit REP="1". The second registers R2 of the devices DRp to DRq are incremented when the word DEB= +5 and the bit A/$\overline{\text{R}}$="1" of the packet PA2 are being detected. The bit REP="1" of the packet PA2 informs the terminal Tdr of the success of the bit rate reservations made by the packet PA1. The third packet PA3 comprises a bit rate word DEB="0" and a bit REP="1" and is transmitted by the terminal Tdr so as to inform the terminal Tdé of the success of the bit rate reservations made by the packet PA2. The terminals Tdr and Tdé then transmit data packets PD respectively at bit rates of 10 and 5 units. At the end of the communication, two packets PF are respectively transmitted by the terminals Tdr and Td6 so as to decrement the corresponding bit rates included in the first and second registers R1 and R2 of the devices DRp to DRq.

Figure 5:
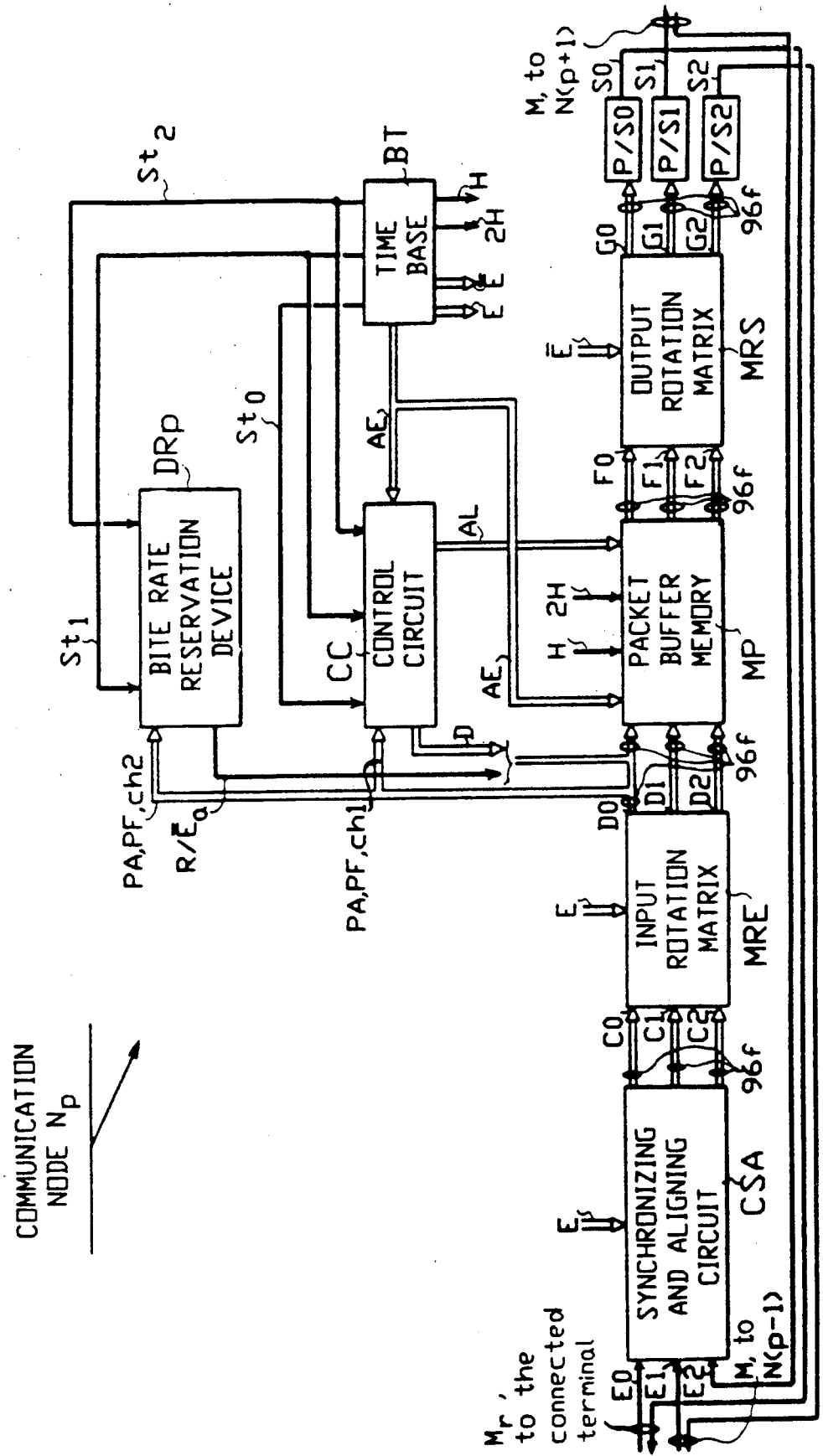
FIG. 5 is a block diagram of a packet switch embodying the invention.

In reference to FIG. 5, any communication node Np of the chained network is of the paragonal conversion type as disclosed in U.S. Pat. No. 4,603,416 and is mainly comprised of a time base BT, a synchronizing and aligning circuit CSA, an input rotation matrix MRE, a packet buffer memory MP, an output rotation matrix MRS, a control circuit CC, and a bit rate reservation device DRp.

The time base BT derives a timing clock H and a clock 2H having a frequency twice that of the clock H, packet write addresses AE, multiplex way addresses "00", "01" and "10" transmitted cyclically in the above order in a bus E and in an opposite order, "10", "01" and "00" in a bus $\overline{\text{E}}$, and three multiplex way signals $St_0$, $St_1$ and $St_2$.

Clocks H and 2H are supplied to the buffer memory MP and control the sequencing of the packet readings and writings in the buffer memory MP.

The packet write addresses AE are provided cyclically to the buffer memory MP and to inputs of three read address queues (FIFOs not shown) included in the control circuit CC.

The multiplex way addresses "00", "01" and "10" supplied by the time base BT are respectively associated with three incoming multiplex ways E0, E1 and E2 and with three outgoing multiplex ways S0, S1 and S2 and determine corresponding time intervals t0, t1 and t2. The addresses are applied at rotation control inputs of the input and output rotation matrices MRE and MRS respectively via the buses E and $\overline{\text{E}}$.

The multiplex ways E0 and S0, E1 and S2, and S1 and E2 respectively constitute the bidirectional connecting multiplex way Mr that connects the node Np to the connected terminal Tp, the bidirectional multiplex way M that connects the node Np to the node N(p−1) and the bidirectional the node Np to the node N(p+1).

The multiplex way signals $St_0$, $St_1$ and $St_2$ in the state "1" respectively indicate the transmission of the multiplex way addresses "00", "01" and "10" and the corresponding time gaps t0, T1 and t2. The multiplex way signals $St_0$, $St_1$ and $St_2$ are supplied to the control circuit CC. The signals $St_1$ and $St_2$ are supplied to the bit rate reservation device DRp.

The purpose of the circuit CSA is to receive incoming packets carried in series bit form by the multiplex ways S0, S1 and E2, to recovery the synchronization, to align the packets and to transmit them in groups of 96 bits in parallel to the input rotation matrix MRE, under the control of the multiplex way addresses "00", "01" and "10" provided by the bus E. Three 96-bit groups provided from the incoming multiplex ways E0, E1 and E2 are transmitted by the circuit CSA towards three input ports C0, C1 and C2 of the input rotation matrix MRE respectively during the time intervals t0, t1 and t2.

The input rotation matrix MRE carries out a cycle of 0 to 2 circular permutations and supplies the packets in diagonal form via three output ports D0, D1 and D2 having 96 parallel outputs each. A service packet PA or PF transmitted by one of the incoming multiplex ways is fed in one single time interval by the 96 outputs of the port D0. A data packet PD is comprised of 36 octets. i.e. 96×3 bits, and is supplied diagonally by the ports D0 to D2. Supposing the packet PD comes from the incoming multiplex way E0, a first group of bits of the packet PD is supplied by the port D0 during the time interval t0, a second group of bits is supplied by the port D1 during the time interval t1, and a third and last group of bits of the packet PD is supplied by the port D2 during the time interval t2.

The port D0 of the matrix MRE comprises outputs connected to the control circuit CC and to the bit rate reservation device DRp so as to respectively transmit, to said circuit and device, useful informations included in the first field ch1 and in the second field ch2 of a packet PA or PF provided by the matrix MRE. other outputs of the port D0 are directly connected to the corresponding inputs of a first input port of the buffer memory MP. The control circuit CC derives a distance word D for the routing of the packet PA. The distance word D is applied at corresponding inputs of the first input port of the buffer memory MP. During bit rate reservation operations carried out as a function of informations read in the field ch1 of the packet PA or PF, the bit rate reservation device DRp supplies an updated bit $R/\overline{E}$, denoted $R/\overline{E}_a$, and applies it in parallel with the distance word D to a corresponding input of the first input port of the buffer memory MP. The ports D1 and D2 of the matrix MRE are respectively connected to second and third input ports of the buffer memory MP.

The buffer memory MP comprises three buffer sub-memories comprised of 96-bit memory cells and of a read addressing circuit (not shown). The three groups of bits of a data packet are respectively memorized in diagonal form in the three sub-memories. The first group is memorized in a first sub-memory cell having address AE: the second group is memorized in a second sub-memory having address AE+1 and the third group is memorized in a third sub-memory cell having address AE+2. The purpose of the read addressing circuit is to derive addresses AL+1 and AL+2 from a read address AL supplied by the control circuit CC. The addresses AL, AL+1 and AL+2 are respectively applied at address inputs of the first, second and third sub-memories thereby reading an outgoing packet to be transmitted towards the output rotation matrix MRS.

The matrix MRS carries out a cycle of 2 to 0 circular permutations. These circular permutations are carried out in an opposite direction to those carried out by the input rotation matrix MRE so as to obtain an opposite paragonal conversion and to issue the outgoing packets in parallel form. The outgoing packets in diagonal form are supplied by three output ports of the buffer memory MP which are respectively connected to three input ports F0, F1 and F2 of the matrix MRs. Three output ports G0, G1 and G2 respectively transmit the outgoing packets in 96-bit groups towards three outgoing multiplex ways S0, S1 and S2. Parallel-to-series converters P/S0, P/S1 and P/S2 are respectively inserted between the ports G0, G1 and G2 and the outgoing multiplex ways S0, S1 and S2 thereby serializing the bits of the outgoing packets.

Figure 6:
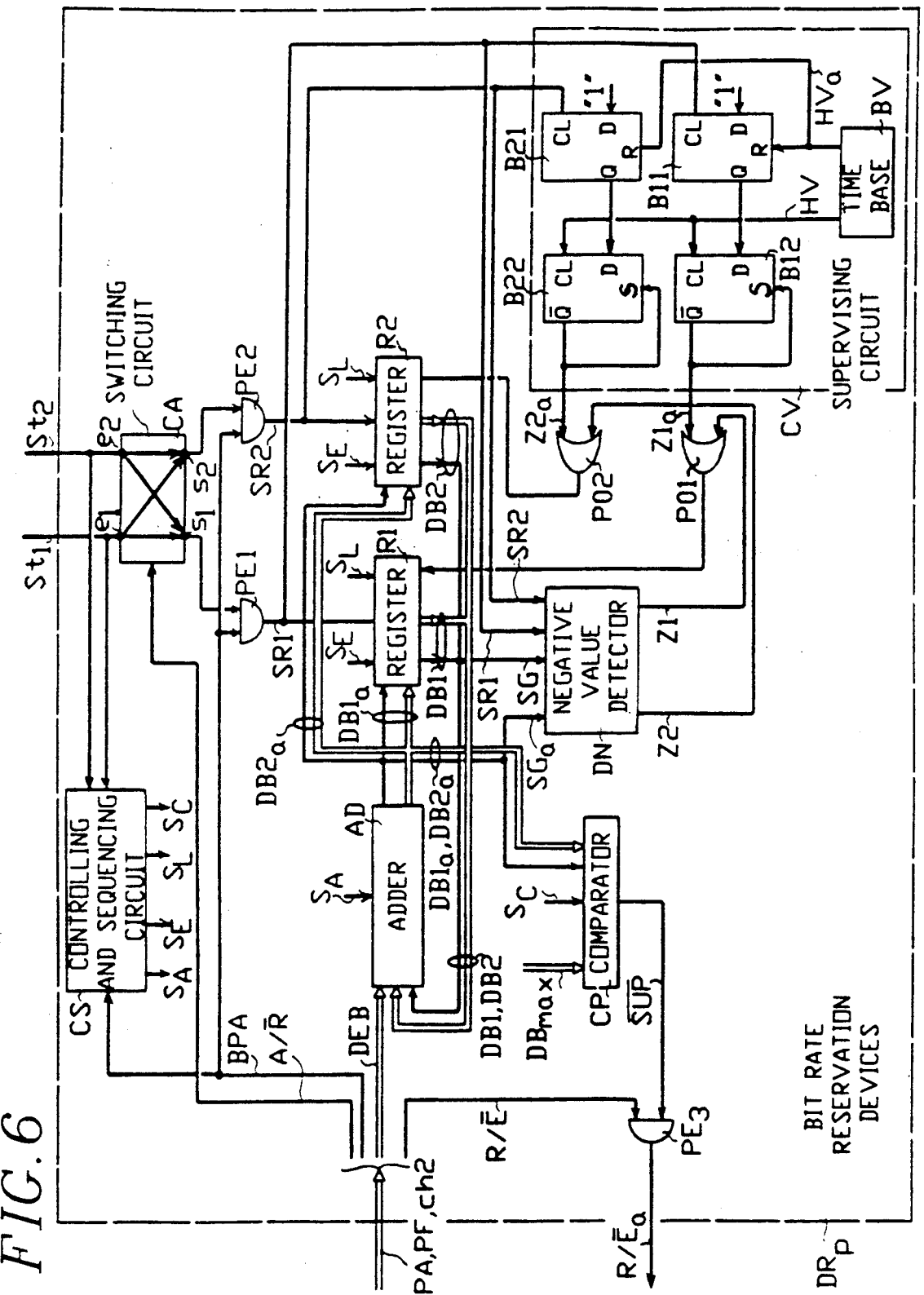
FIG. 6 is a detailed block diagram of a bit rate reservation device included in the switch shown in FIG. 5.

In reference to FIG. 6, the bit rate reservation device DRp is essentially comprised of a controlling and sequencing circuit CS, a switching circuit CA, an adder AD, first and second bit rate reservation registers R1 and R2. a word comparator CP, a negative value detector DN, and a supervising circuit CV.

The controlling and sequencing circuit CS receives the multiplex way signals $St_1$ and $St_2$ and the bit BPA and supplies control and sequencing signals $S_A$, $S_E$, and $S_L$ and $S_C$.

The signal $S_A$ is applied to a load control input of the adder AD. The signals $S_E$ and $S_L$ are respectively applied to write control inputs and read control inputs of the registers R1 and R2. The signal $S_C$ is applied to a control input of the comparator CP in order to select the comparator and to activate the comparator operation.

The purpose of the switching circuit CA is to select one of the bit rate reservation registers R1 and R2 as a function of the multiplex way signals $St_1$, $St_2$ and of the bit $A/\overline{R}$. The switching circuit CA comprises first and second inputs e1 and e2 respectively receiving the signals $St_1$, $St_2$, and first and second outputs s1 and s2 connected to first inputs respectively of first and second two-input AND gates PE1 and PE2. The signal $A/\overline{R}$ is applied to a switching control input of the circuit CA. second inputs of the gates PE1 and PE2 receive the bit BPA. The gates PE1 and PE2 respectively supply register selection signals SR1 and SR2. The signals SR1 and SR2 are applied to selection inputs of the registers R1 and R2 respectively.

The purpose of the adder AD is to add the bit rate word DEB to the contents of the selected register R1 or R2.

The adder AD comprises a first input port receiving the bit rate word DEB and a second input port connected to output ports of the registers R1 and R2 to receive bit rate words DB1 and DB2 contained in the registers R1 and R2.

The bit rate reservation registers R1 and R2 are respectively associated with the multiplex ways E1, S1 and E2, S2. The bit rate words DB1 and DB2 contained in the registers R1 and R2 represent the bit rates carried respectively by the multiplex ways E1, S1 and E2, S2. The registers R1 and R2 comprise input ports connected to an output port of the adder AD and respectively receive bit rate words $DB1_a$ and $DB2_a$ such that $DB1_a = DB1 \pm [DEB]$ and $DB2_a = DB2 \pm [DEB]$, whereby [DEB] represents the signless bit rate value corresponding to the bit rate word DEB.

The purpose of the comparator CP is to detect bit rate overstepping, if any, in the multiplex ways E1, S1 and E2, S2. The comparator CP comprises first and second input ports receiving respectively the maximum bit rate DBmax and the bit rate word $DB1_a$ or $DB2_a$ supplied by the adder AD. The comparator CP supplies a signal $\overline{SUP}$ in the state "1" when the value of the bit rate word $DB1_a$ or $DB2_a$ is less than the maximum bit rate DBmax, and in the state "0" in the opposite case. The signal $\overline{SUP}$ is applied to a first input of a two-input AND gate PE3 of which a second input receives the bit $R/\overline{E}$ read in the call packet PA.

When a service packet PA or PF, i.e. BPA="1", is supplied by the input rotation matrix MRE and when the multiplex way signal $St_1$ (respectively $St_2$) and the bit $A/\overline{R}$ are in the state "1", the signal SR1 (respectively SR2) is in the state "1" and selects the register R1 (respectively R2). When a service packet PA or PF, i.e. BPA="1", is supplied by the input rotation matrix MRE and when the multiplex way signal $St_1$ (respectively $St_2$) and the bit $A/\overline{R}$ are respectively in the states "1" and "0", the signal SR2 (respectively SR1) is in the state "1" and selects the register R2.

When a service packet PA or PF is supplied by the matrix MRE and when the register R1 (respectively R2) is selected, the controlling and sequencing circuit CS activates the signal $S_L$ and consecutively the register R1 (respectively R2) supplies the bit rate word DB1 (respectively DB2). The bit rate words DEB and DB1 (respectively DB2) are then respectively applied to the first and second input ports of the adder AD, and the controlling and sequencing circuit CS produces the signal $S_A$ which controls the loading of said words in the adder AD. The adder AD then provides the bit rate word $DB1_a = DB1 \pm [DEB]$ (respectively $DB2_a = DB2 \pm [DEB]$) and the controlling and sequencing circuit CS produces the signals $S_E$ and $S_C$ to control the writing of the bit rate word $DB1_a$ (respectively $DB2_a$) in the register R1 and to compare the word $DB1_a$ to the maximum bit rate DBmax in the comparator CP.

When the bit rate word $DB1_a$ (respectively $DB2_a$) supplied by the adder AD has a value lower than the maximum bit rate DBmax, the signal $\overline{SUP} = "1"$ opens the gate PE3, and the outgoing bit $R/\overline{E}_a$ is in the same state as the incoming bit $R/\overline{E}$.

In the opposite case when the bit rate word $DB1_a$ (respectively $DB2_a$) supplied by the adder AD has a value higher than the maximum bit rate DBmax, the signal $\overline{SUP} = "0"$ closes the gate PE3, and the outgoing bit $R/\overline{E}_a$ is set in the state "0" and indicates reservation failure.

The negative value detector DN is connected to outputs of the registers R1 and R2 and adder AD to receive sign bits SG and $SG_a$ respectively corresponding to the bit rate words DB1, DB2 and $DB1_a$, $DB2_a$. The selection signals SR1 and SR2 are also supplied to the negative value detector DN so as to inform it as to which of the bit rate reservation registers R1 or R2 has been selected and therefore as to the origin of the sign bit SG or $SG_a$ read by the detector. When a sign bit SG, $SG_a = "1"$ indicating a negative value and the selection signal $SR1 = "1"$ (respectively SR2) are read by the detector DN, the detector DN supplies a register triggering signal Z1 (respectively Z2) which is applied to a zero-resetting input of the register R1 (respectively R2) via a two-input OR gate PO1 (respectively PO2). The negative value detector DN thus avoids negative values of bit rate words being taken into account, the latter caused e.g. by calculation errors on the part of the adder AD.

The purpose of the supervising circuit CV is to periodically initiate the registers R1 and R2 in order to avoid possible interlocks caused e.g. by erroneous values contained in the registers R1 and R2 and not representative of bit rates effectively disposed of. To do so, the supervising circuit CV supervises the activity of the multiplex ways E1, S1 and E2, S2 and reset the register R1 and R2 at zero when no activity is detected.

The supervising circuit CV comprises a time base BV, and two pairs of D-type flips-flops, B11, B12 and B21, B22. The flips-flops B11 and B12 produce an initiation signal $Z1_a$ intended for the register R1. The flips-flops B21 and B22 produce an initiation signal $Z2_a$ intended for the register R2.

The time base BV derives supervisory clock pulse signals HV and $HV_a$ at a very low frequency. The signal HV is applied to clock inputs CL of the flips-flops B12 and B22. The signal $HV_a$ is substantially phase-shifted by comparison with the signal HV and is applied to inputs of the flips-flops B11 and B21 for resetting in the state "0", R. Clock inputs CL of the flips-flops B11 and B21 respectively receive the selection signals SR1 and SR2. Data inputs D of the flips-flops B11 and B21 are at state "1". Outputs Q of the flips-flops B11 and B21 are connected to data inputs D respectively of the flips-flops B12 and B22. Reverse outputs $\overline{Q}$ of the flips-flops B12 and B22 are looped onto inputs for resetting in the state "1", and respectively issue the initiation signals $Z1_a$ and $Z2_a$. The initiation signals $Z1_a$ and $Z2_a$ are applied via the gates PO1 and PO2 to zero-resetting inputs respectively of the registers R1 and R2.

When, between two pulses of the supervisory clock signals HV and $HV_a$, the signal SR1 (respectively SR2) comes at least once into the state "1" and selects the register R1 (respectively R2), the flip-flop B11 (respectively B21) is written in the state "1" and when an pulse of the signal HV in the state "1" then occurs, the state "1" of the flip-flop B11 (respectively B21) is written in the flip-flop B12 (respectively B22) and the signal $Z1_a$ (respectively $Z2_a$) is consecutively determined in the inactive state "1". Activity has been detected in the register R1 (respectively R2) and the latter is therefore not initiated. An pulse of the signal $HV_a$ occurs after the pulse of the signal HV and resets the flip-flop B11 (respectively B21) in the state "0".

When the signal SR1 (respectively SR2) remains in the state "0" between two pulses of the supervisory clock signals HV and $HV_a$, the state of the flip-flop B12 (respectively B22) is "0" when the pulse of the signal HV occurs, and the signal $Z1_a$ (respectively $Z2_a$) switches and remains in the state "1" for a short period prior to the zero-resetting of the flip-flop B12 (respectively B22) as a result of the looping of the output $\overline{Q}$ of the flip-flop with the input R for resetting in the state "0". The pulse in the state "1" of the signal $Z1_a$ (respectively $Z2_a$) initiates the register R1 (respectively R2) at zero.

What we claim is:

1. A time-division packet switch included in a packet switching network having packet transmitting and receiving terminals through said network,
   a communication transmitted between a first and a second of said terminals including (a) first and second packets respectively transmitted from said first terminal to said second terminal at the beginning and end of said communication and (b) third packets exchanged after said first packet and before said second packet between said first and second terminals, each of said first, second and third packets including routing information for determining a route for said communication between said first and second terminals through said network, each of said first and second packets including a bit rate word,
   said packet switch comprising:
      plural incoming packet multiplex ways and plural outgoing packet multiplex ways connected through said network to the packet transmitting and receiving terminals, said incoming and outgoing ways having variable transmission rates less than a predetermined maximum rate,
      input means for detecting said first, second and third packets in said incoming multiplex ways to thereby derive synchronized packets, the first and second packets after being synchronized respectively being first and second synchronized packets, means connected to said input means for multiplexing said synchronized packets, means for detecting the routing information in said synchronized packets, means for switching said multiplexed packets into switched packets in response to the detected routing information, means for demultiplexing said switched packets to thereby transmit the demultiplexed switched packets towards said outgoing multiplex ways, means for detecting said bit rate words in said first and second synchronized packets, plural addressed storing means respectively allocated to said outgoing multiplex ways for storing cumulated rates in said outgoing multiplex ways, means for addressing one of said storing means in response to said routing information in said first and second synchronized packets, means for cumulating said bit rate word detected in each of said first and second synchronized packets and said cumulated rate in said addressed storing means, and means for comparing said cumulated rate with said maximum rate, said switching means responding to the synchronized first packet of said communication to switch said first, second and third packets of that communication to one of said outgoing multiplex ways only in response to said cumulated rate being less than said maximum rate.

2. The switch of claim 1 wherein each bit rate word in said first and second packets of said communication respectively represents a positive and negative value, said bit rate word in said second packet being a two's complement of said bit rate word in said first packet.

3. The switch of claim 2 wherein said storing means includes means for detecting a negative cumulated rate caused particularly by defective operation and for resetting said negative cumulated rate to zero, and means for supervising the activity of each of said incoming multiplex ways and for setting said cumulated rate contained in said storing means at a predetermined value corresponding to said incoming multiplex ways having no detected activity.

4. The switch of claim 1 wherein said storing means includes means for detecting a negative cumulated rate caused particularly by defective operation and for resetting said negative cumulated rate to zero, and means for supervising the activity of each of said incoming multiplex ways and for setting said cumulated rate contained in said storing means at a predetermined value corresponding to said incoming multiplex ways having no detected activity.

5. A packet switching network comprising a first packet transmitting and receiving terminal for transmitting a communication to a second packet transmitting and receiving terminal, the communication including a first packet and a second packet respectively at the beginning and end of the communication and third packets exchanged after said first packet and before said third packet between said first and second terminals, each packet including routing information for determining a route of said first, second and third packets for said communication between said first and second terminals through said network, a bit rate word being included only in said first and second packets, a time-division packet switch included in said network including:

plural incoming packet multiplex ways and plural outgoing packet multiplex ways connected through said network to the packet transmitting and receiving terminals, said incoming and outgoing ways having variable transmission rates less than a predetermined maximum rate, input means for detecting said first, second and third packets in said incoming multiplex ways to thereby derive synchronized packets, the first and second packets after being synchronized respectively being first and second synchronized packets, means connected to said input means for multiplexing said synchronized packets, means for detecting the routing information in said synchronized packets, means for switching said multiplexed packets into switched packets in response to the detected routing information, means for demultiplexing said switched packets to thereby transmit the demultiplexed switched packets towards said outgoing multiplex ways, means for detecting said bit rate words in said first and second synchronized packets, plural addressed storing means respectively allocated to said outgoing multiplex ways for storing cumulated rates in said outgoing multiplex ways, means for addressing one of said storing means in response to said routing information in said first and second synchronized packets, means for cumulating said bit rate word detected in each of said first and second synchronized packets and said cumulated rate in said addressed storing means, and means for comparing said cumulated rate with said maximum rate, said switching means responding to the synchronized first packet of said communication to switch said first, second and third packets of that communication to one of said outgoing multiplex ways only in response to said cumulated rate being less than said maximum rate.

6. The network of claim 5 wherein each bit rate word in said first and second packets of said communication respectively represents a positive and negative value, said bit rate word in said second packet being a two's complement of said bit rate word in said first packet.

7. The network of claim 6 wherein said storing means includes means for detecting a negative cumulated rate caused particularly by defective operation and for resetting said negative cumulated rate to zero, and means for supervising the activity of each of said incoming multiplex ways and for setting said cumulated rate contained in said storing means at a predetermined value corresponding to said incoming multiplex ways having no detected activity.

8. The network of claim 5 wherein said storing means includes means for detecting a negative cumulated rate caused particularly by defective operation and for resetting said negative cumulated rate to zero, and means for supervising the activity of each of said incoming multiplex ways and for setting said cumulated rate contained in said storing means at a predetermined value corresponding to said incoming multiplex ways having no detected activity.

* * * * *